US006978296B2

(12) United States Patent
Maeda et al.

(10) Patent No.: US 6,978,296 B2
(45) Date of Patent: Dec. 20, 2005

(54) METHOD FOR REGISTERING A TERMINAL WITH AN INTERNET SERVICE PROVIDER

(75) Inventors: Satoru Maeda, Kanagawa (JP); Manabu Onishi, Tokyo (JP)

(73) Assignee: Sony Corporation, Tokyo (JP)

( * ) Notice: Subject to any disclaimer, the term of this patent is extended or adjusted under 35 U.S.C. 154(b) by 818 days.

(21) Appl. No.: 09/965,873

(22) Filed: Sep. 28, 2001

(65) Prior Publication Data

US 2002/0073184 A1 Jun. 13, 2002

(30) Foreign Application Priority Data

Oct. 10, 2000 (JP) .............................. 2000-308872

(51) Int. Cl.[7] .............................................. G06F 13/00
(52) U.S. Cl. ........................ 709/219; 709/225; 709/227
(58) Field of Search ............................... 709/217, 219, 709/225, 227, 229; 719/328, 329

(56) References Cited

U.S. PATENT DOCUMENTS

| 5,101,499 A | 3/1992 | Streck et al. |
| 5,410,326 A | 4/1995 | Goldstein |
| 5,410,343 A | 4/1995 | Coddington et al. |
| 5,467,341 A | 11/1995 | Matsukane et al. |
| 5,802,467 A | 9/1998 | Salazar et al. |
| 5,815,665 A * | 9/1998 | Teper et al. ................. 709/229 |
| 5,862,339 A | 1/1999 | Bonnaure et al. |
| 5,896,131 A | 4/1999 | Alexander |
| 5,917,810 A | 6/1999 | De Bot |
| 5,920,701 A | 7/1999 | Miller et al. |
| 5,933,141 A | 8/1999 | Smith |
| 5,949,432 A | 9/1999 | Gough et al. |
| 6,012,088 A | 1/2000 | Li et al. |
| 6,028,600 A | 2/2000 | Rosin et al. |
| 6,037,998 A | 3/2000 | Usui et al. |
| 6,097,441 A | 8/2000 | Allport |
| 6,145,002 A * | 11/2000 | Srinivasan ................... 709/225 |

(Continued)

FOREIGN PATENT DOCUMENTS

CN 1249644 4/2000

(Continued)

OTHER PUBLICATIONS

Vazquez-Cortizo D et al: "FS-aloha, a collision resolution algorithm with Qos support for the contention channel in multiservices wireless Lan" Global Telecommunications Conference (GLOBECOM 99), vol. 5, Dec. 5, 1999, pp. 2773-2777, XP010373453.

(Continued)

Primary Examiner—Viet D. Vu
(74) Attorney, Agent, or Firm—Frommer Lawrence & Haug; William S. Frommer

(57) ABSTRACT

A terminal apparatus setting method is provided, comprising the steps of connecting a terminal apparatus to a setting server which is provided for registering with one or more Internet service providers associated with the setting server. The terminal apparatus receives information regarding the one or more Internet service providers associated with the setting server from the setting server, and a desired one of the one or more Internet service providers associated with the setting server is selected. Selection information indicative of the selected Internet service provider is sent to the setting server. An input request regarding registration items required by the selected Internet service provider is received from the setting server. Registration information is in response to the required registration items in the input request and sending the registration information to the setting server. Setting information is finally received from the setting server for setting up the terminal apparatus necessary to utilize the selected Internet service provider.

16 Claims, 2 Drawing Sheets

U.S. PATENT DOCUMENTS

| | | | |
|---|---|---|---|
| 6,263,503 | B1 | 7/2001 | Margulis |
| 6,317,792 | B1 * | 11/2001 | Mundy et al. ............... 709/227 |
| 6,393,412 | B1 * | 5/2002 | Deep ........................... 705/400 |
| 6,396,523 | B1 | 5/2002 | Segal et al. |
| 6,417,869 | B1 | 7/2002 | Do |
| 6,469,633 | B1 | 10/2002 | Wachter |
| 6,670,970 | B1 | 12/2003 | Bonura et al. |
| 6,898,623 | B1 * | 5/2005 | Williams et al. ............ 709/206 |
| 2001/0034693 | A1 * | 10/2001 | Farhat et al. ................. 705/37 |

FOREIGN PATENT DOCUMENTS

| | | |
|---|---|---|
| DE | 196 28 540 | 1/1998 |
| DE | 200 00 450 | 3/2000 |
| EP | 0 477 754 | 4/1992 |
| EP | 0 537 814 | 4/1993 |
| EP | 0 617 556 | 9/1994 |
| EP | 0 793 170 | 9/1997 |
| EP | 0 838 945 | 4/1998 |
| EP | 0 848 560 | 6/1998 |
| EP | 0 942 572 | 9/1999 |
| EP | 0 967 797 | 12/1999 |
| EP | 1 001 627 | 5/2000 |
| EP | 1 011 257 | 6/2000 |
| GB | 2 343 334 | 5/2000 |
| WO | WO 95 34168 | 12/1995 |
| WO | WO 98 59282 | 12/1998 |
| WO | WO 99 34599 | 7/1999 |
| WO | WO 00 14919 | 3/2000 |
| WO | WO 01 35551 | 5/2001 |
| WO | WO 01 35585 | 5/2001 |

OTHER PUBLICATIONS

"Wireless Medium Access Control (MAC) and Physical (PHY) Specifications" IEEE Standard 802.11-1997, XX, XX, 1997, pp. 71-99, XP002927753.

Gang Wu et al: "WINMAC: a novel transmission protocol for infostations" Vehicular Technology Conference, 1999 IEEE 49$^{TH}$ Houston, TX, USA May 16-20, 1999, Piscataway, NJ, USA, IEEE, US, May 16, 1999, pp. 1340-1344, XP010342188, ISBN: 0-7803-5565-2.

Truman T et al: "The Infopad Multimedia Terminal: A Portable Device for Wireless Information Access" IEEE Transactions on Computers, IEEE Inc. New York, US, vol. 47, No. 10, Oct. 1, 1998, pp. 1073-1087, XP000781992.

Patent Abstracts of Japan vol. 1998, No. 14, Dec. 31, 1998 & JP 10 257401 A (ACCESS:KK) Sep. 25, 1998.

Patent Abstracts of Japan, 2001-177478 dated Jun. 29, 2001.

* cited by examiner

METHOD FOR REGISTERING A TERMINAL WITH AN INTERNET SERVICE PROVIDER

FIELD OF THE INVENTION

The invention relates generally to a terminal apparatus setting method and more particularly to a method for performing various settings to allow a terminal apparatus to utilize a desired Internet service provider (ISP) out of a plurality of Internet service providers by entering into a contract utilizing an on-line sign procedure housed on a remote server.

BACKGROUND OF THE INVENTION

In order for a user of a terminal such as a personal computer to transmit and retrieve information via the Internet, an Internet service provider must be used to provide a proper Internet connection. The user must enter into a service contract with an Internet service provider (ISP) and register a user name and a password therewith. Upon entry into such a contract with an ISP, the user must confirm contract terms, select a method of payment (one time or continued payments of a service charge), provide the number of a credit card, receive an account number, and so forth. Further, the user must set a DSN server address and a mail server address at the computer based on information provided by the ISP with which the user enters into the contract. It would be beneficial to provide an improved method and apparatus for entering into such a contract and concluding all requirements associated therewith.

SUMMARY OF THE INVENTION

Generally speaking, as has been noted by the inventor of this application, contract terms and an accounting method that must be entered into between a user and an ISP are different among different ISP's. Furthermore, it may be cumbersome for a beginner or first time user of a personal computer to set a DSN server address and a mail server address as instructed by a selected ISP with which the user intends to enter into a contract.

Therefore, in order to ease this sign-up process, recently almost all ISPs provide a sign up program installed on a newly purchased computer. When the installed sign up program is started, then the user enters into a contract with an ISP through a simple data input operation. The program automatically performs various setup procedures on the user's personal computer so that a connection to the Internet may be established using the desired ISP. The setup program completes the contract entry and Internet setup by contacting the ISP via the Internet. Therefore, even a beginner can enter into a contract with an ISP and establish a connection to the Internet simply.

Because different ISP's require different information, a pre-loaded sign up program for each ISP must be provided with the newly-purchased computer. Thus, a large number of pre-loaded sign-up programs must be retained in storage of the new computer. This requirement imposes considerable burden on the storage capacity of the user computer terminal. Because most ISPs provide their own sign up programs preinstalled in a personal computer, a newly purchased personal computer must have a large number of sign up programs, one for each different potential ISP. Each of the programs may have a size of approximately 500 kB or more. However, in most cases a user enters into a contract with only one ISP. Therefore, most of the large number of sign up programs for different ISPs preinstalled on the computer are not used. Thus, the sign up programs other than the program of a provider with which the user enters into a contract are not used. They remain in the storage of the personal computer and impose considerable burden on the storage capacity thereof.

Therefore, in accordance with the invention, a terminal apparatus setting method is provided which simplifies a necessary operation to be performed in order to enter into a contract with a desired ISP and eliminates the necessity for a sign up program for each ISP to be stored in the storage device of a personal computer.

According to the invention, a terminal apparatus setting method is provided in which a terminal apparatus is connected to a setting server which is provided for allowing a user to enter into a contract with one or more of a plurality of Internet service providers (ISPs). These ISPs have previously contracted with the setting server. Therefore, the setting server is aware of the information required by each ISP during sign up of a user. During use, the terminal apparatus receives information regarding the plurality of Internal service providers which have contracted with the setting server from the setting server. A user then selects a desired one of the Internet service providers (ISPs). This selection information designating a selected Internet service provider (ISP) is transmitted to the setting server. In accordance with the selected ISP, the setting server sends to the terminal apparatus a data input request regarding registration items required by the selected ISP. The user of the terminal apparatus inputs registration information regarding the required registration items in accordance with the data input request. The registration information is then sent back to the setting server. The setting server then transmits to the terminal apparatus setting information necessary to utilize the selected ISP.

In accordance with the terminal apparatus setting method of the invention, through the use of the provided setting server for entering into a contract with a selected one of a plurality of ISPs that have an agreement with the setting server, the terminal apparatus can enter into a contract one or more of a plurality of ISPs on-line without requiring a preinstalled sign up program for each ISP. The storage requirements at the terminal apparatus can be reduced. Further, proper settings in the terminal apparatus can be implemented by the setting server upon successively inputting necessary information at the terminal apparatus. Consequently, complicated parameter setting need not be performed by the user of the terminal apparatus. Furthermore, if identification information regarding the terminal apparatus is sent to the setting server, then display contents and an automatic setting method for setting various required parameters of the terminal apparatus can be selected by the setting server in accordance with the type of terminal apparatus being utilized.

Further, in accordance with the terminal apparatus setting method of the invention, when a user performs registration to a selected ISP, the setting server collects a charge from the user for the ISP. Also, future payments can be set up. Furthermore, if the terminal apparatus information and the ISP registration information of users are stored in a customer database, the data may be utilized for a variety of different services or purposes.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENT

Figure 1:
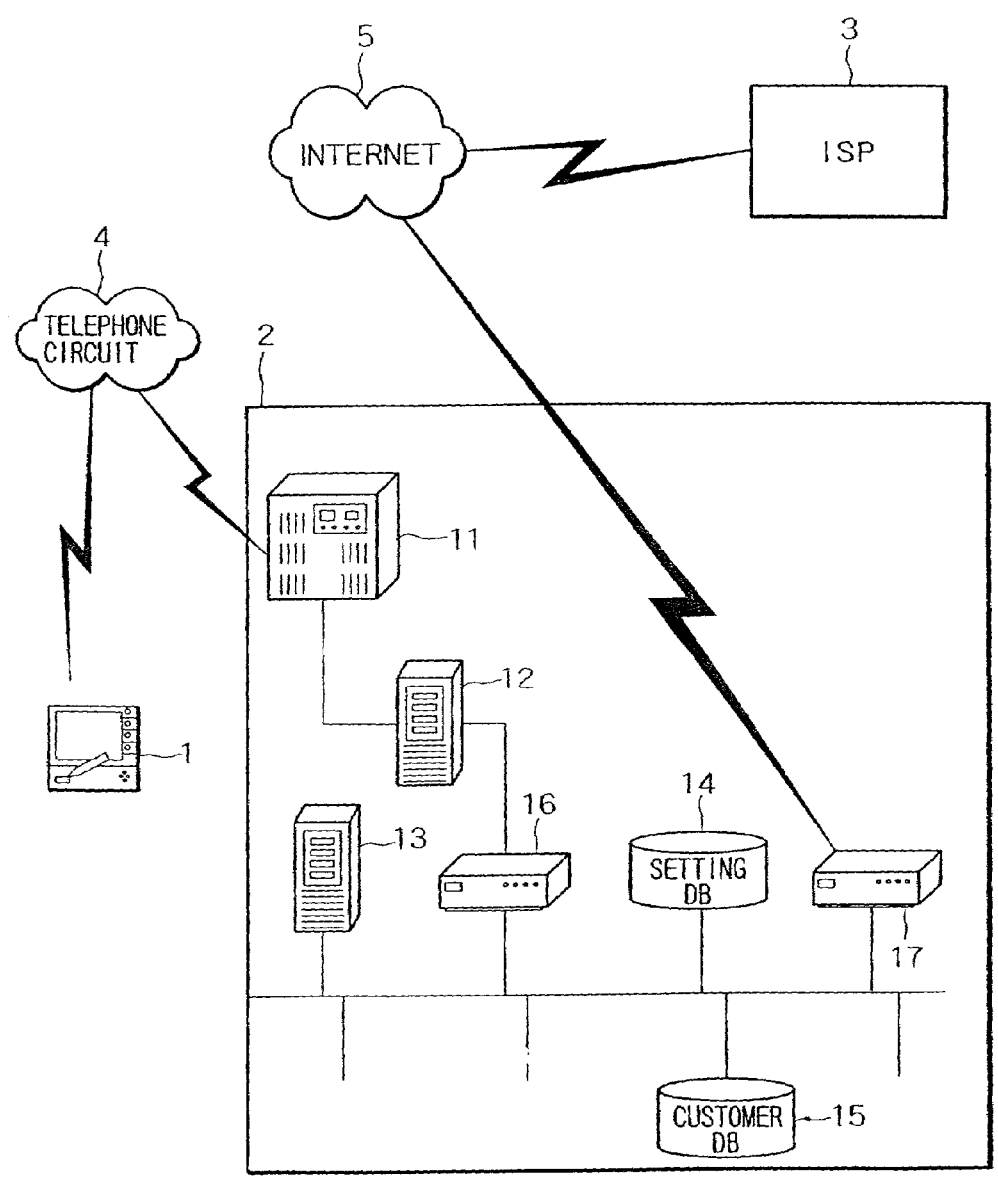
FIG. 1 is a block diagram illustrating a terminal apparatus setting method in accordance with the invention.

Referring first to FIG. 1, a general configuration of a system to which a terminal apparatus setting method according to the invention is applied is shown. The system includes a terminal apparatus 1, a setting server 2, and an Internet service provider (ISP) 3. The terminal apparatus 1 is connected to setting server 2 by a telephone circuit 4 or other appropriate data transmission medium. Setting server 2 and ISP 3 can communicate data over Internet 5.

Terminal apparatus 1 can be, for example, a personal computer or other computing device such as a handheld computer, special purpose computing device or the like. Though not shown, terminal apparatus 1 includes a display unit such as a CRT (Cathode Ray Tube) or an LCD (Liquid Crystal Display) unit and an input apparatus such as a keyboard and/or a mouse. If a handheld device, alternative input devices may be provided. Further, though not shown, terminal apparatus 1 includes a built-in modem. Furthermore, though not shown, terminal apparatus 1 includes a protocol stack such as the PPP, TCP/IP or HTTP to be used for establishment of a connection to the Internet.

Terminal apparatus 1 may be connected to setting server 2 via telephone circuit 4 or other appropriate communication channel. After terminal apparatus 1 is connected to setting server 2, by telephone circuit 4, for example, selection information for selecting among a plurality of ISPs associated with setting server 2 is sent from setting server 2 to terminal apparatus 1. After selection of a desired one of the plurality of ISPs, input requesting information items necessary for entry into a contract with the selected ISP are sent from setting server 2 to terminal apparatus 1. After all required information is successively input in response to the input request items, then a contract is entered into on-line with the desired ISP.

Further, information necessary to set up the terminal apparatus for appropriate communication with the selected ISP, to set an appropriate DNS server and to set the address of a mail server corresponding to the selected ISP is sent from setting server 2 to terminal apparatus 1. Terminal apparatus 1 includes a program for performing a setup operation based upon the received setup information.

Setting server 2 is provided to implement this processing as described above and includes a modem server 11, a web server 12, a processing server 13, a setting database (DB) 14, a customer database 15, and fire walls 16 and 17.

Modem server 11 is provided to connect setting server 2 to terminal apparatus 1 over telephone circuit 4. Modem server 11 includes a plurality of modems so that it may accept simultaneous connections from a plurality of terminal apparatus 1. A telephone number for connecting terminal apparatus 1 to setting server 2 over telephone circuit 4 is set in each terminal apparatus 1 in advance. Also a user name and a password for authentication upon connection are set in each terminal apparatus 1 in advance.

Web server 12 is provided to allow setting server 2 to communicate with terminal apparatus 1. Data communication between terminal apparatus 1 and setting server 2 is performed via web server 12 in accordance with HTTP protocol or the like. Processing of data in a web page is performed by processing server 13. Web server 12 accepts a processing request or a display request from terminal apparatus 1 and retrieves and supplies data from processing server 13 to terminal apparatus 1.

Processing server 13 accepts a registration request from terminal apparatus 1 via web server 12, and controls operation of databases 14 and 15 and oversees a transaction between setting server 2 and ISP 3.

Setting database 14 stores therein a list of items necessary for registration and data of a registration service charge (data for collection for an ISP) for each ISP associated with setting server 2. Customer database 15 stores therein information (i.e. name, address, telephone number, credit card number and so forth) input by a user upon registration with a particular ISP. Fire walls 16 and 17 are provided for protection from an external network.

FIGS. 2A to 2E illustrate processing performed in accordance with the invention when setting server 2 is used to perform an on-line sign up with a desired ISP.

Figure 2A:
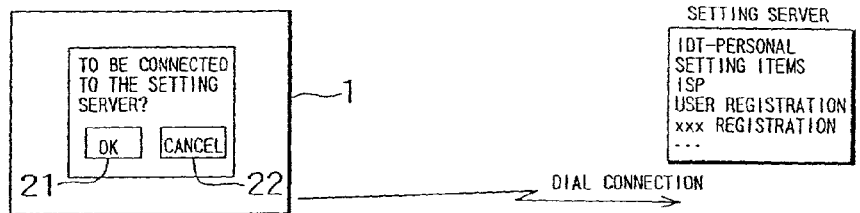
FIGS. 2A to 2E are flow diagrams illustrating different stages of the terminal apparatus setting method of the invention.

In an initial state, a startup screen such as that as shown in FIG. 2A is displayed on a display section of terminal apparatus 1. This startup screen includes a display of a selection button 21 for connecting terminal apparatus 1 to setting server 2 to start a setup process for selecting an ISP, and a cancel button 22 for canceling the setup process.

If selection button 21 is clicked, then the telephone number, or other appropriate address of setting server 2 is utilized so that terminal apparatus 1 is connected to setting server 2 over telephone circuit 4 through a dial-up connection. A user name and a password required for connection to setting server 2 are set in advance in the terminal apparatus 1, and are therefore forwarded to setting server 2 as apparatus information when necessary.

Setting server 2 communicates with databases 14 and 15 and produces display data (HTML DATA) to be sent and displayed to a user on terminal apparatus 1. Setting server 2 therefore includes communication protocols suitable for communication with terminal apparatus 1. The communication protocol used by the display data production function for communicating with and producing display data for terminal apparatus 1 is HTTP via web server 12. Setting server 2 includes customer database 15 and setting database 14 therein.

When terminal apparatus 1 is connected to setting server 2, information regarding terminal apparatus 1, such as a model number thereof and a version of the software installed thereon is transmitted from terminal apparatus 1 to setting server 2 as apparatus information as noted above. The transmitted information regarding terminal apparatus 1 is used by setting server 2 to properly set up terminal apparatus 1. In the present example, registration data are transmitted in response to a query of the HTTP information transmitted from setting server 2, and the apparatus information is registered into the setting database 14 after being sent from terminal apparatus 1.

Figure 2B:
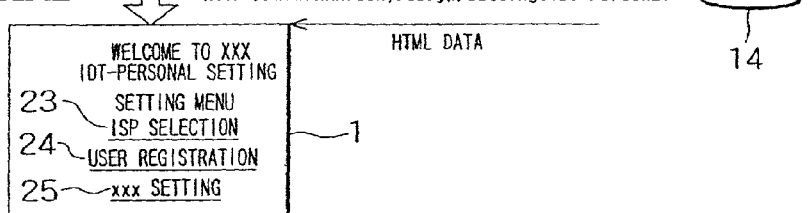

After terminal apparatus 1 is connected to setting server 2 and registration is performed, a setting screen such as shown in FIG. 2B is displayed on display of terminal apparatus 1 after the data is received by terminal apparatus 1. The setting screen includes a setting menu including an item 23 for "ISP selection", another item 24 for "User registration" and a further setting item 25, as well as any other necessary items.

Figure 2C:
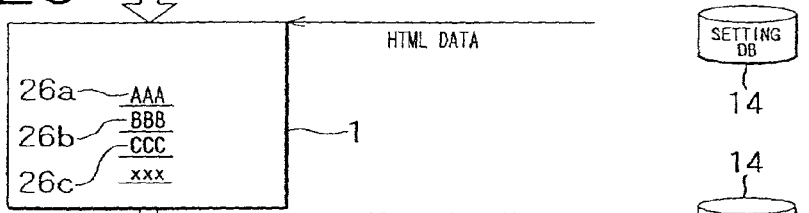

If item 23 for "ISP selection" is clicked, ISP SETTING SELECTION DATA is sent from terminal apparatus 1 to setting server 2. Then an ISP selection screen is displayed on the terminal apparatus 1 after being received as HTML DATA by terminal apparatus 1, as shown in FIG. 2C. Those ISPs that can be selected are ISPs which are agreed upon in advance. Information for each of the ISPs is stored in setting database 14. The names of the ISPs that may be selected are displayed at 26a, 26b, 26c, . . . . The user observes the ISP selection screen and clicks the name display 26a, 26b, 26c, . . . corresponding to the ISP the user wants to select.

Figure 2D:
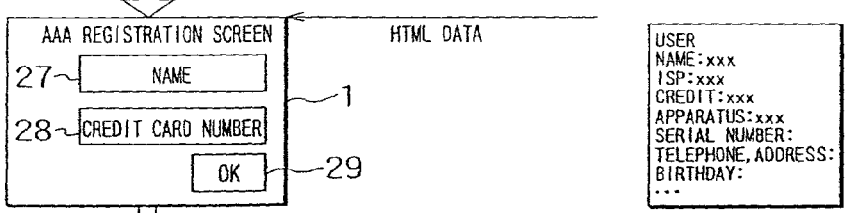

Once the user selects an ISP to enter into a contract with ISP SELECTION DATA is transmitted from terminal apparatus 1 to setting server 2. Then, a registration screen for inputting necessary information to enter into such a contract with the selected ISP is displayed as shown in FIG. 2D after being received as HTML data from setting server 2. Items necessary for entry into a contract with the selected ISP are stored in setting database 14. An input request is generated based on the items necessary for the selected ISP, and an input box is generated based on the inputting request. In the present example a name and a credit card number are necessary items, and an input box 27 and an input box 28 are displayed on the display screen.

At terminal apparatus 1 the name of the user is input into input box 27 and a credit card number owned by the user is input into input box 28. A confirmation button 29 is then clicked. The registration information input by the user is sent as USER REGISTRATION DATA from terminal apparatus 1 to web server 12 as shown. In the present example, the registration information from the user is sent in response to a query of the HTTP data. The registration information input by the user is stored in customer database 15.

Setting server 2 receives the registration information from the user and transmits the received registration information to the selected ISP 3. Setting server 2 and ISP 3 are connected to each other via Internet 5. The registration information received at setting server 2 from the user is sent from setting server 2 to ISP 3 through Internet 5.

It is to be noted that a direct connection leased circuit, or any other conduit may be used to connect setting server 2 and ISP 3. Where setting server 2 and ISP 3 are connected to each other through the Internet 5, the data is preferably sent in an encrypted state so that the registration information of the user may not be determined by anyone other than setting server 2.

ISP 3 receives registration information and checks the validity of the data items and returns an indication of acceptance or rejection of the registration of the user from setting server 2. If the user can be registered, then ISP 3 sends information necessary for properly setting up terminal apparatus 1 to utilize ISP 3 such as a user name, password, information of an access point, an address of a proper DNS server, and an address of a mail server to setting server 2. Setting server 2 receives this information from ISP 3 as ISP SETTING DATA and stores the information into customer database 15. Further, setting server 2 converts the received information into a format so that it can be transmitted to, and utilized by terminal apparatus 1. The formatted information is then transmitted to terminal apparatus 1.

It is to be noted that the transmitted setting information may include the telephone number of an access destination, the user name, the password, the address of the DNS server, and the address of the mail server, and the like. Of the kinds of information mentioned, the telephone number of the access destination, the address of the DNS server and the address of the mail server are determined in advance for each ISP. Such information may reside at setting server 2. Thus, only personal information such as the user name and the password need to be received from ISP 3. Also it is possible to distribute to terminal apparatus 1 all setting information from setting server 2 and send an user name and a password distributed from ISP 3 to terminal apparatus 1 later.

Terminal apparatus 1 receives the setting information sent thereto from web server 12 via setting server 2 and starts up a program for automatically configuring terminal apparatus 1 in accordance with the received setting information. The startup of such a program may be initiated by setting server 2 by determining the type of terminal apparatus 1 from the terminal apparatus information which was sent from terminal apparatus 1 to setting server 2. A Java script or an application program may be exclusively used for such automatic setup.

The same data can be used by a plurality of terminal apparatus 1 by using a prescribed format for the setting data. For example, if an XML protocol is used, then the following format may be used:

<?xml version=<"1.0"?>X
<setting>
<ISP>
AAA
</ISP>
<DSN1>
43.2.2.1
</DNS1>
<DNS2>
43.2.2.253
</DNS2>
<MailAddress>
<hogehoge@xxx.aaa.ne.jp>
</MailAddress>
</setting>

It is to be noted that the format above is merely an example. The same setting function can be used by a plurality of terminal apparatus by formally defining a DTD (Document Type Definition) or the like as a specification. Further, where such a uniform format is used, it is not necessary to allow for plurality of setting data, to be interpreted, and a plurality of setting programs to be available at terminal apparatus 1.

Figure 2E:
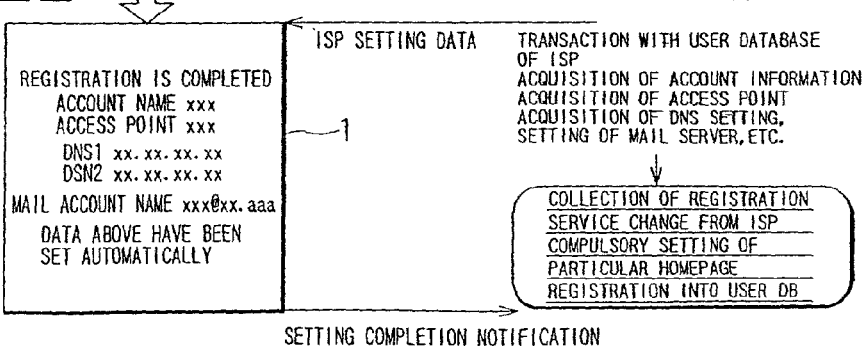

When the automatic setup of terminal apparatus 1 is complete, a schedule of items that have been setup is displayed as shown in FIG. 2E. A completion notification is also sent from terminal apparatus 1 to setting server 2.

It is to be noted that, if the registration input by the user is not legal or proper, for example, if the credit card number is invalid, then an error message is displayed in reply to the registration request from setting server 2 to terminal apparatus 1.

Setting server 2 receives a setting completion notification from terminal apparatus 1 and returns a registration completion notification to ISP 3, thereby completing the registration. After the registration is completed, a fixed service charge or other agreed upon compensation is paid from ISP 3 to setting server 2.

As described above, in accordance with the invention, if the user of terminal apparatus 1 connects terminal apparatus 1 to setting server 2 and inputs necessary registration information, then various settings necessary to enter into a contract and register with an ISP to establish connection to the Internet can be performed automatically. Because setting server 2 acts for a plurality of ISPs it is not necessary to provide a program for signing up for each ISP.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A terminal apparatus setting method, comprising the steps of:
    connecting a terminal apparatus to a setting server which is provided for registering with one or more Internet service providers associated with said setting server before said terminal apparatus is coupled to anyone of said one or more Internet service providers;
    receiving, by said terminal apparatus, information regarding said one or more Internet service providers associated with said setting server from said setting server;
    selecting a desired one of said one or more Internet service providers associated with said setting server and sending selection information indicative of said selected Internet service provider to said setting server;
    receiving an input request regarding registration items required by said selected Internet service provider from said setting server;
    inputting registration information in response to said required registration items in said input request and sending said registration information to said setting server; and
    receiving setting information from said setting server for setting up said terminal apparatus necessary to utilize said selected Internet service provider;
    whereby said terminal apparatus is free from having installed therein, prior to being connected to said setting server, information associated with and needed for selecting from and registering to said one or more Internet service providers.

2. The terminal apparatus setting method according to claim 1, wherein
    said setting server and said one or more Internet service providers communicate with each other, and said terminal apparatus receives said setting information for setting up said terminal apparatus necessary for utilizing said selected Internet service provider through said setting server.

3. The terminal apparatus setting method according to claim 1, wherein,
    after said terminal apparatus receives said setting information, said terminal apparatus automatically sets one or more items necessary to utilize said selected Internet service provider based on said setting information.

4. The terminal apparatus setting method according to claim 3, wherein,
    when said terminal apparatus is connected to said setting server, information regarding said terminal apparatus is sent from said terminal apparatus to said setting server, and
    processing for automatically setting said one or more items necessary to utilize said selected Internet service provider based on said setting information is performed from said setting server using the information regarding said terminal apparatus.

5. The terminal apparatus setting method according to claim 1, wherein,
    each time said terminal apparatus is set, a service charge is paid from said Internet service provider to said setting server.

6. The terminal apparatus setting method according to claim 1, wherein
    a common format is used for the setting information for a plurality of terminal apparatus.

7. The terminal apparatus setting method according to claim 1, wherein,
    each time said terminal apparatus is set, said setting server registers registration information of each user as customer information into a database.

8. A terminal apparatus, comprising:
    means for connecting a terminal apparatus to a setting server which is provided for registering with one or more Internet service providers associated with said setting server before said terminal apparatus is coupled to anyone of said one or more Internet service provider;
    a receiver for receiving information regarding said one or more Internet service providers associated with said setting server from said setting server;
    means for selecting a desired one of said one or more Internet service providers associated with said setting server and sending selection information indicative of said selected Internet service provider to said setting server; said receiver further receiving an input request regarding registration items required by said selected Internet service provider from said setting server; and
    means for inputting registration information in response to said required registration items in said input request and sending said registration information to said setting server; and said receiver further receiving setting information from said setting server for setting up said terminal apparatus necessary to utilize said selected Internet service provider;
    whereby said terminal apparatus is free from having installed therein, prior to being connected to said setting server, information associated with and needed for selecting from and registering to said one or more internet service providers.

9. The terminal apparatus according to claim 8, wherein
    said setting server and said plurality of Internet service providers communicate with each other, and said terminal apparatus receives the setting information for setting up said terminal apparatus necessary for utilizing said selected Internet service provider through said setting server.

10. The terminal apparatus according to claim 8, wherein, after said terminal apparatus receives the setting information said terminal apparatus automatically sets one or more items necessary to utilize said selected Internet service provider based on said setting information.

11. The terminal apparatus according to claim 10, wherein,
when said terminal is connected to said setting server, information regarding said terminal apparatus is sent from said terminal apparatus to said setting server, and processing for automatically setting said one or more items necessary to utilize said selected Internet service provider based on said setting information is performed from said setting server using the information regarding said terminal apparatus.

12. The terminal apparatus according to claim 8, wherein, each time said terminal apparatus is set, a service charge is paid from said Internet service provider to said setting server.

13. The terminal apparatus according to claim 8, wherein a common format is used for the setting information to a plurality of terminal apparatus.

14. The terminal apparatus according to claim 8, wherein, each time said terminal apparatus is set, said setting server registers registration information of each user as customer information into a database.

15. A terminal setting program, stored on a computer readable recording medium said program comprising:
an instruction for connecting a terminal apparatus to a setting server which is provided for registering with one or more Internet service providers associated with said setting server before said terminal apparatus is coupled to anyone of said one or more Internet service provider;
an instruction for receiving, by said terminal apparatus, information regarding said one or more Internet service providers associated with said setting server from said setting server;
an instruction for selecting a desired one of said one or more Internet service providers associated with said setting server and sending selection information indicative of said selected Internet service provider to said setting server;
an instruction for receiving an input request regarding registration items required by said selected Internet service provider from said setting server;
an instruction for inputting registration information in response to said required registration items in said input request and sending said registration information to said setting server; and
an instruction for receiving setting information from said setting server for setting up said terminal apparatus necessary to utilize said selected Internet service provider;
whereby said terminal apparatus is free from having installed therein, prior to being connected to said setting server, information associated with and needed for selecting from and registering to said one or more Internet service providers.

16. A recording medium associated with a terminal apparatus, said recording medium including data for assisting in the set up of said terminal apparatus, said data comprising instructions for performing the steps of:
connecting a terminal apparatus to a setting server which is provided for registering with one or more Internet service providers associated with said setting server before said terminal apparatus is coupled to anyone of said one or more Internet service provider;
receiving, by said terminal apparatus, information regarding said one or more Internet service providers associated with said setting server from said setting server;
selecting a desired one of said one or more Internet service providers associated with said setting server and sending selection information indicative of said selected Internet service provider to said setting server;
receiving an input request regarding registration items required by said selected Internet service provider from said setting server;
inputting registration information in response to said required registration items in said input request and sending said registration information to said setting server; and
receiving setting information from said setting server for setting up said terminal apparatus necessary to utilize said selected Internet service provider;
whereby said terminal apparatus is free from having installed therein, prior to being connected to said setting server, information associated with and needed for selecting from and registering to said one or more Internet service providers.

* * * * *